(12) United States Patent
Caretta et al.

(10) Patent No.: US 6,956,466 B2
(45) Date of Patent: Oct. 18, 2005

(54) ANTI-THEFT DEVICE FOR A VEHICLE AND METHOD FOR ACTIVATING THE ANTI-THEFT DEVICE

(75) Inventors: Renato Caretta, Gallarate (IT); Flavio Fontana, Cormano (IT); Vittorio Giaroli, Milan (IT)

(73) Assignee: Pirelli Pneumatic S.p.A., Milan (IT)

( * ) Notice: Subject to any disclaimer, the term of this patent is extended or adjusted under 35 U.S.C. 154(b) by 0 days.

(21) Appl. No.: 10/432,524

(22) PCT Filed: Nov. 23, 2001

(86) PCT No.: PCT/EP01/13666

§ 371 (c)(1),
(2), (4) Date: Nov. 5, 2003

(87) PCT Pub. No.: WO02/42095

PCT Pub. Date: May 30, 2002

(65) Prior Publication Data

US 2004/0090344 A1 May 13, 2004

Related U.S. Application Data

(60) Provisional application No. 60/262,634, filed on Jan. 22, 2001.

(30) Foreign Application Priority Data

Nov. 27, 2000 (EP) ............................................. 00830778
Jun. 29, 2001 (EP) ............................................. 01115912

(51) Int. Cl.[7] ............................................. B60R 25/10
(52) U.S. Cl. ............... 340/426.11; 340/447; 340/425.5; 340/426.33
(58) Field of Search ............... 340/426.11, 445, 340/447, 429, 425.5, 426.24, 426.33, 442; 73/146.4, 146.5

(56) References Cited

U.S. PATENT DOCUMENTS

| | | | | |
|---|---|---|---|---|
| 4,319,220 A | | 3/1982 | Pappas et al. | 340/447 |
| 4,805,723 A | | 2/1989 | Aoki et al. | 180/289 |
| 4,947,151 A | * | 8/1990 | Rosenberger | 340/426.33 |
| 5,081,443 A | | 1/1992 | Breit | 340/426.25 |
| 5,500,637 A | * | 3/1996 | Kokubu | 340/447 |
| 5,963,128 A | * | 10/1999 | McClelland | 340/447 |
| 5,973,411 A | | 10/1999 | Tado et al. | 340/5.62 |
| 6,194,997 B1 | | 2/2001 | Buchner et al. | 340/426.26 |
| 2002/0101335 A1 | * | 8/2002 | Ghabra et al. | 340/426 |

FOREIGN PATENT DOCUMENTS

WO    WO 01/08908    2/2001

* cited by examiner

*Primary Examiner*—Donnie L. Crosland
(74) *Attorney, Agent, or Firm*—Finnegan, Henderson, Farabow, Garrett & Dunner, L.L.P.

(57) ABSTRACT

An anti-theft device for a vehicle with tyre wheels includes an immobilization device, at least one detection control unit, and at least one sensor. The immobilization device activates an anti-theft procedure. The at least one detection control unit is connected to the immobilization device and verifies an alarm condition. The at least one sensor is associated with one or more of the tyre wheels, communicates with the at least one detection control unit, detects movement of one or more of the tyre wheels, and detects inflation pressure of one or more of the tyre wheels. A method for activating an anti-theft device for a vehicle with tyre wheels includes detecting an alarm condition from at least one of the tyre wheels, receiving the detected condition, and activating an anti-theft procedure.

44 Claims, 5 Drawing Sheets

ANTI-THEFT DEVICE FOR A VEHICLE AND METHOD FOR ACTIVATING THE ANTI-THEFT DEVICE

CROSS-REFERENCE TO RELATED APPLICATIONS

This application is a national-phase entry under 35 U.S.C. §371 from International Application No. PCT/EP01/13666, filed Nov. 23, 2001, in the European Patent Office, the contents of which are relied upon and incorporated herein by reference; additionally, Applicants claim the right of priority under 35 U.S.C. §119(a)–(d) based an patent application No. 00830778.7, filed Nov. 27, 2000, in the European Patent Office, and patent application No. 01115912.6, filed Jun. 29, 2001, in the European Patent Office; further, Applicants claim the benefit under 35 U.S.C. §119(e) based on provisional application No. 60/262,634, filed Jan. 22, 2001, in the U.S. Patent and Trademark Office.

BACKGROUND OF THE INVENTION

1. Field of the Invention

The present invention relates to an anti-theft device for vehicles. In particular, the present invention relates to an anti-theft device for vehicles provided with tyres and a method for activating the anti-theft device.

2. Description of the Related Art

It is known, according to the state of the art, that most anti-theft devices are installed inside the car and are based on varyingly improved techniques in which perimeter-defense sensors of various types are used, said sensors being often associated with a control system based on the recognition of coded keys necessary for activation/deactivation of the anti-theft device itself. These keys transmit, via radio, a cede to said control system, using suitably reserved frequency ranges.

For example, U.S. Pat. Nos. 6,194,997 and 4,805,723 describe anti-theft devices for motor vehicles in which a monitoring device inside the vehicle is able to detect the presence of persons inside the vehicle. This monitoring device is activated by a key which, at the same time, is able to lock the doors for access to the vehicle.

The Applicant has observed that, although very versatile and efficient and, in principle, capable of being incorporated into systems for monitoring the position of the vehicle of the GPS (Ground Position System) type, the traditional anti-theft devices are often affected by factors which reduce the degree of reliability thereof. Among these the following may be mentioned:

the control units have in fact a standardized location, thereby in principle resulting in the possibility of their being discovered and deactivated by criminals with a certain technical knowledge;

not all the anti-theft devices, in particular if low-cost, are able to detect any movement of the vehicle if it has been raised by a special mechanical means; this especially if the vehicle is actually raised from the ground and removed without causing rolling of the wheels;

traditional anti-theft devices, if removed, do not necessarily cause an irreversible deterioration or locking of certain vital components in the mechanical structure of the vehicle;

in any case, even in the most inexpensive versions; anti-theft systems often constitute a not negligible fraction of the cost of the vehicle; this discourages their use in many types of utility or low-power vehicles which, on the other hand, appear to be one of the preferred targets of car thieves.

SUMMARY OF THE INVENTION

The Applicant has tackled the problem of providing a reliable anti-theft device in which the situation of a possible attempted theft is detected as a result of any type of displacement of the vehicle caused by the attempted theft itself.

The Applicant has found that the displacement of a vehicle caused by an attempted theft may be effectively detected by the tyres of the vehicle itself. In particular, the Applicant has found that, by inserting a sensor inside the tyres of the vehicle, which is able to detect the movement of said tyres and raising thereof from the ground (absence of load), it is possible to determine with certainty a condition of displacement of the vehicle caused by an attempted theft.

A first aspect of the present invention relates to an anti-theft device for vehicles provided with tyre wheels, comprising:

an immobilization device able to activate a procedure for operation of the anti-theft device itself, a detection control unit connected to said immobilization device and able to verify an alarm condition, a sensor which is associated with at least one of said tyre wheels, communicates with said control unit and is able to detect the movement and inflation pressure of at least one of said tyre wheels.

Preferably, said sensor comprises a mobile station associated with said rim and a fixed station arranged on said vehicle and able to send electric energy to said mobile station during the movement of the vehicle tyre wheels.

Preferably, said mobile station comprises an accelerometric switch.

Preferably, said mobile station comprises a pressure sensor.

In particular, said mobile station comprises an electric energy storage device able to store the electric energy supplied by said fixed station.

In particular, said mobile station comprises a transmitter device able to communicate, to said control unit on the vehicle, the information detected by said pressure sensor and said accelerometric switch.

Preferably, said electric energy is sent to said mobile station at least once for each revolution of said wheel.

Preferably, said fixed station comprises a support element, constrained at one of its ends to a hub on which a rim of said tyre wheel is mounted, and an electronic board constrained to said support element.

Preferably, said fixed station comprises a fixed antenna which communicates with a mobile antenna arranged on said mobile station.

In particular, said fixed antenna and said mobile antenna are inductively coupled together.

A further aspect of the present invention relates to a method for activating an anti-theft device for a vehicle provided with tyre wheels, comprising the steps of:

detecting an alarm condition resulting from at least one of said tyre wheels, receiving this detected condition, activating a procedure for operation of said anti-theft device.

Preferably, said step of detecting an alarm condition comprises detecting the rotation or inflation pressure of at least one of said tyre wheels.

BRIEF DESCRIPTION OF THE DRAWINGS

Further characteristic features and advantages of the present invention may be understood in greater detail from the following description, with reference to the accompanying drawings provided solely by way of example and without intending to be limiting in any way, where.

DETAILED DESCRIPTION OF THE EMBODIMENT

Figure 1:
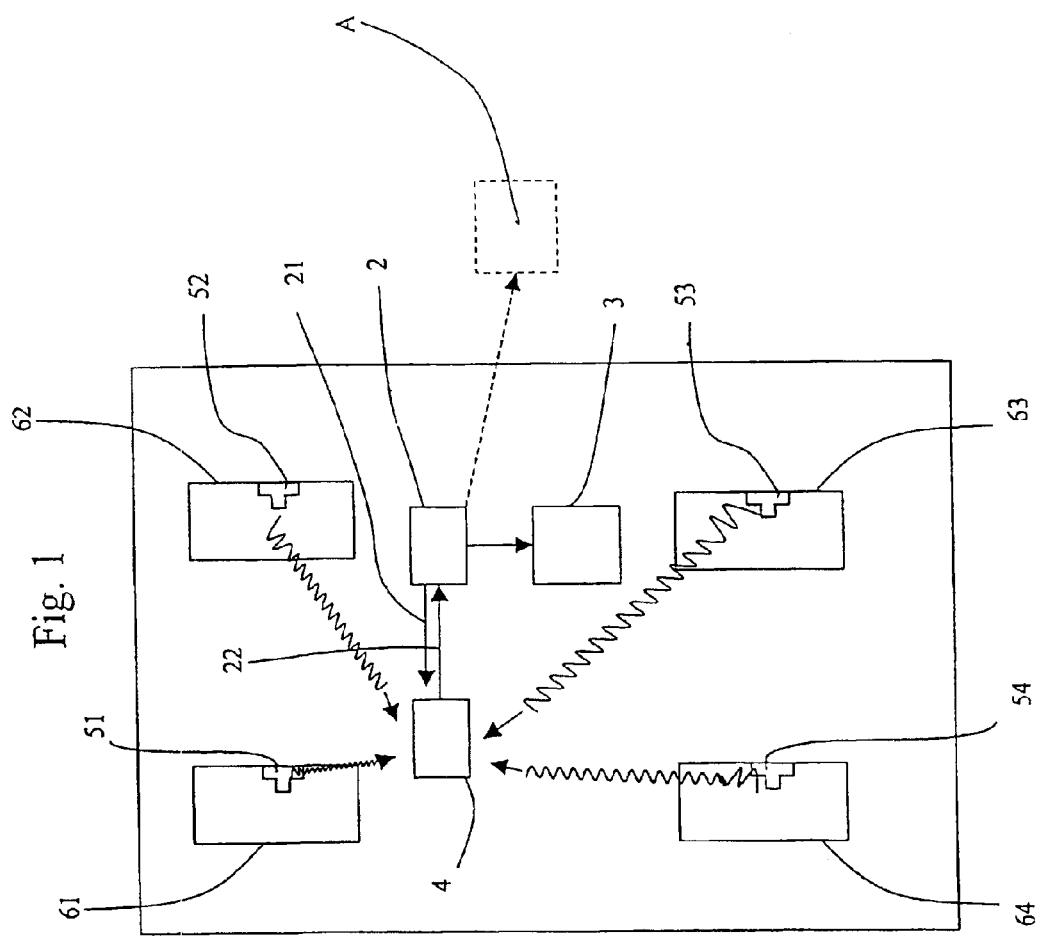
FIG. 1 shows a general diagram of the anti-theft device for vehicles according to the present invention.

FIG. 1 shows an example of an anti-theft device for a vehicle according to the present invention. In particular, this anti-theft device comprises an immobilization device 2 preferably connected to an acoustic alarm 3 and/or to an apparatus A associated with said vehicle and able to transmit the alarm condition to remote control centres. The immobilization device may also advantageously be of the known type associated with a conventional anti-theft device which is commercially available.

The immobilization device is a device which locks and unlocks the doors for access to the vehicle and/or prevents and allows start-up of the engine and/or activation of a procedure for operation of the anti-theft device itself.

Preferably, this operating procedure envisages activation of this acoustic alarm and/or locking of the vehicle access doors and/or transmission of the alarm condition, via the apparatus A, to remote control centres at the same time as activation of a GPS receiver so as to be able to transmit the position of the vehicle to this remote control centre.

The anti-theft device comprises, moreover, a control unit 4 provided with a receiver which communicates with at least one sensor associated with at least one tyre of the vehicle and is able to verify an alarm condition.

Preferably, the anti-theft device comprises a sensor associated with each tyre of the vehicle. The example according to FIG. 1 shows schematically a vehicle 1 provided with four tyre wheels 61, 62, 63 and 64; a sensor 51, 52, 53 and 54 is present in each of said tyre wheels. The control unit 4 is preferably able to detect the condition of an attempted theft on the basis of the signals received from at least one of the sensors associated with the tyres.

This immobilization device operates advantageously with the aid of a coded key, which is preferably of the rolling-code type. This type of key comprises an identification code which, once recognized by said immobilization device, allows switching-on or switching-off of the anti-theft device itself. In particular, this identification code is periodically modified inside the key. The immobilization device is able to determine, for example, by means of an identification algorithm, whether the identification code generated in that instant by the key is one of the codes envisaged. U.S. Pat. No. 5,973,411 describes an anti-theft device for vehicles which uses a key of the rolling-code type. In particular, an identification code is stored in a key able to allow start-up of the vehicle engine. This identification code is read and compared with a predefined set of identification codes in order to determine whether this code stored in the key forms part of this predefined set. If this is the case, the vehicle engine may be started up. The code contained in the key is updated whenever the vehicle engine is started up with one of the codes of this predefined set.

The immobilization device 2 is connected to the control unit 4 by means of a first gate 21. This gate generates a signal which is preferably of the logic type, i.e. assumes Boolean values. The value of this signal results in enabling or disabling of the control unit 4 which controls the sensors 51, 52, 53 and 54 mounted on the tyre rims, preventing the occurrence of false alarms should the vehicle be moved by its legitimate owner. In particular, if the code contained in the key is recognized by the immobilization device 2, the value of this signal is such as to disable the control unit 4.

A second gate 22 connects the control unit 4 to the immobilization device. This gate generates a signal which is preferably of the logic type, i.e. assumes Boolean values. The value of this signal produces said alarm condition detected by the control unit via the sensors associated with the tyres and causes, within the immobilization device, the start of the operating procedure in the manner described above.

Alternatively, the anti-theft device according to the present invention may comprise a control unit for each sensor present in the tyres, for example in the case of four tyres and four sensors there may be four control units. In this way, the problems of interference between the signals sent by the sensors are reduced since the latter operate, for example, at different frequencies from each other. The four control units communicate with the immobilization device each via a logic gate, and the alarm condition detected by any one of the control units starts the abovementioned operating procedure.

Figure 2:
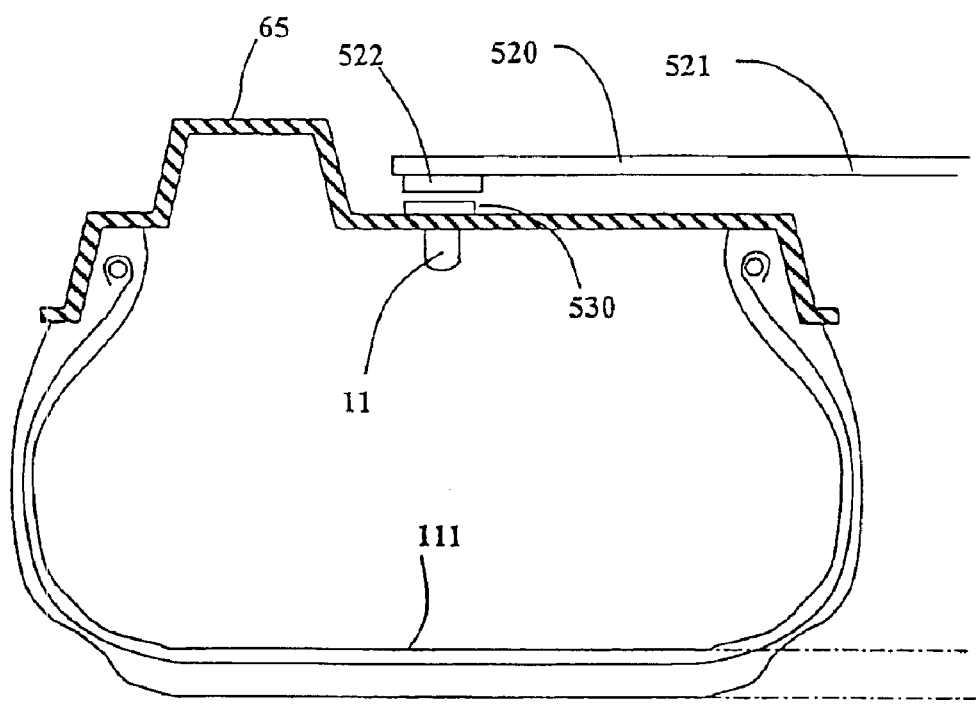
FIG. 2 shows a cross section through a tyre mounted on its support rim, illustrating a sensor associated with this rim and comprising a mobile station and a fixed station.

FIG. 2 shows an example of the sensor 51 or 52 or 53 or 54 of FIG. 1 in accordance with the present invention, mounted on the support rim 65 of a tyre (61 or 62 or 63 or 64 in FIG. 1) and associated with a vehicle. The sensor comprises a mobile station 530 which is mounted in the wall of the support rim 65 and preferably includes an emitter/receiver device 11 arranged inside the cavity defined between tyre and rim, preferably along the centre plane of said rim.

This mobile station 530 comprises a transmitter which sends the data detected by said emitter/receiver device 11 to a fixed station 520 arranged on said vehicle. This fixed station may advantageously communicate with said control unit 4 in any suitable manner, for example via cable or by means of radio waves.

The fixed station is preferably associated with the corresponding hub of the vehicle by means of suitable support devices described below.

The mobile station and fixed station communicate with each other in any suitable manner, for example by means of magnetic coupling between the two stations or by means of radio waves, preferably of the high-frequency type.

Figure 3:
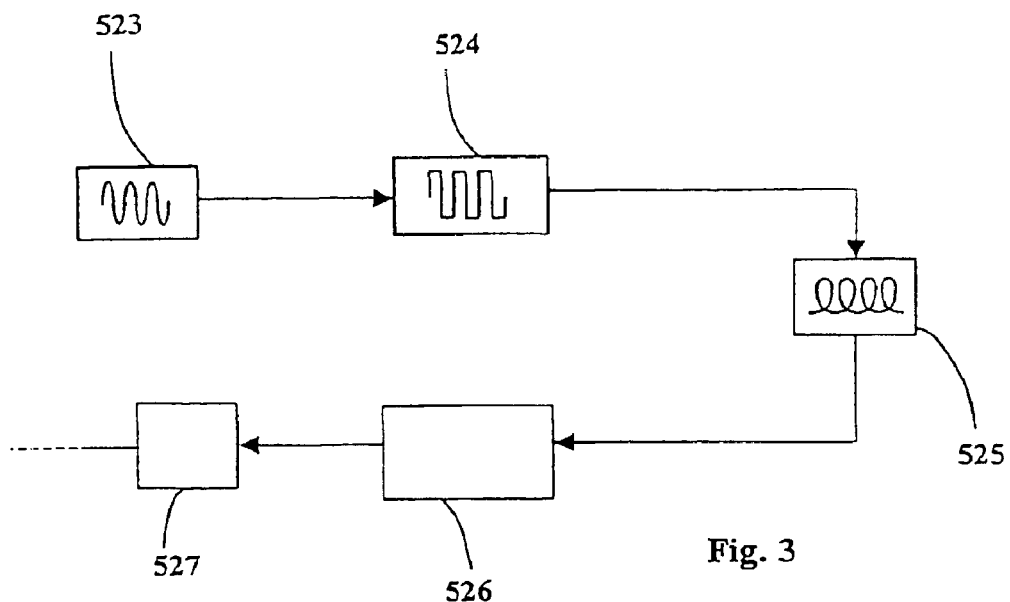
FIG. 3 shows a block diagram of the electronic circuit present inside the fixed station shown in FIG. 2.

In a preferred embodiment, the fixed station 520 comprises a support element 521, which is fixed at one of its ends to the hub of a wheel, and an electronic board 522 which is preferably arranged at the opposite end of said support element and the block diagram of which is illustrated in FIG. 3.

In particular, said electronic board comprises an oscillator circuit 523 which supplies a driver circuit 524 for a first antenna 525 referred to below as "fixed antenna".

Said board preferably also comprises a radiofrequency receiver 526 connected to said antenna and an electric demodulator device 527.

The electric energy necessary for powering said station may advantageously be supplied directly by the vehicle battery via a suitable driver circuit (not shown).

Figure 4:
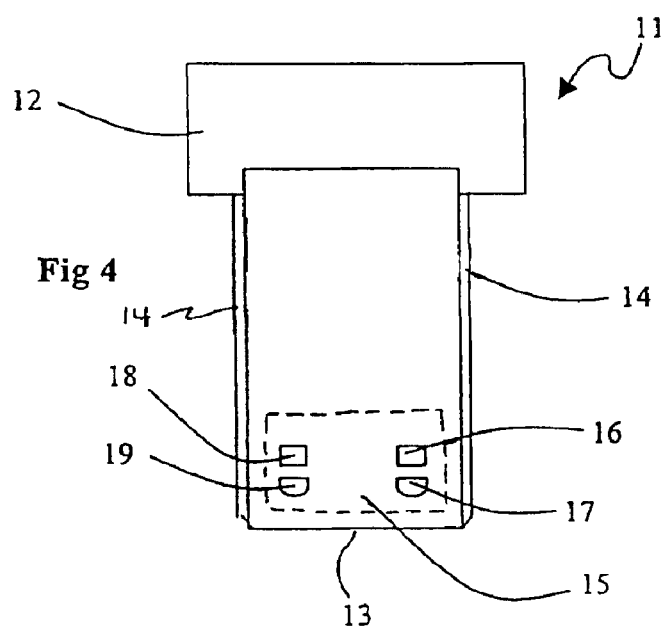
FIG. 4 shows in detail the component parts of the mobile station.

The mobile station 530 shown in FIG. 4 comprises the emitter/receiver device 11 which in turn comprises a hollow support 12 which is preferably made of plastic and inside which an externally threaded tube 13 is inserted, preferably by means of screwing. The external threading 14 of the tube 13 allows both insertion of the tube itself into the support and fixing of the station as a whole inside the wall of the wheel support rim 65. Alternatively, the wall of the support may be threaded both externally, for fixing of the station in the rim wall, and internally to allow mounting of the tube 13. The main function of the support 12 is to form an airtight plug for closing the hole formed in the body of the rim 65.

The tube 13 has, inserted inside it, an electronic board 15 with which an optical beam emitter device 16, a first lens 17, an optical beam receiver device 18 and a second lens 19 are associated.

Figure 6:
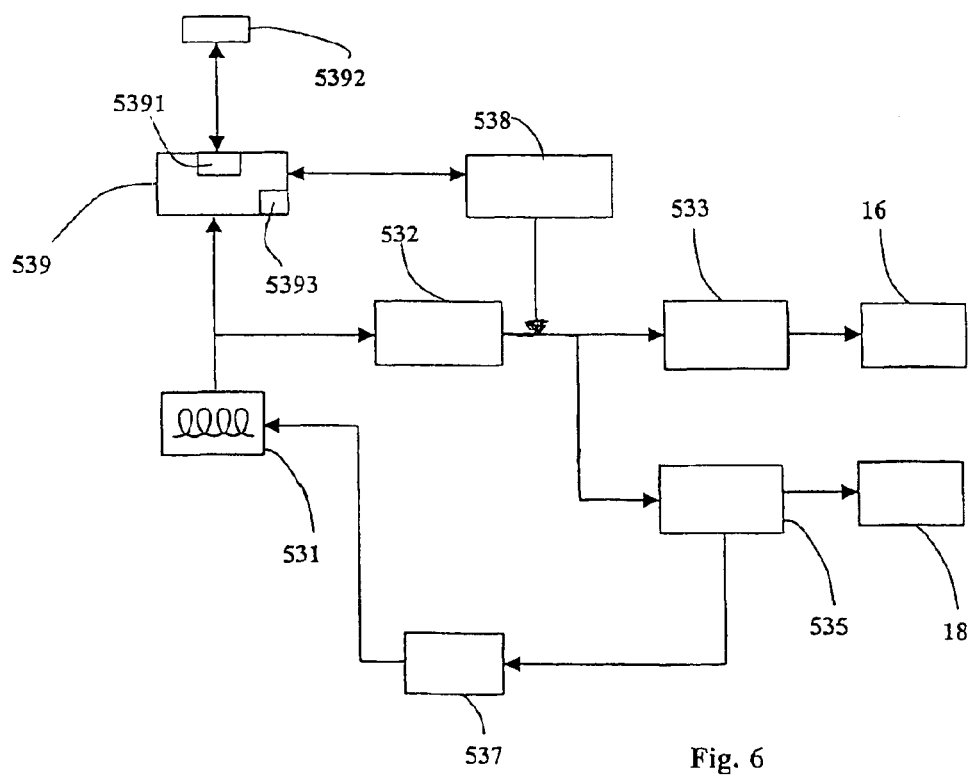
FIG. 6 shows a block diagram of the mobile station according to the present invention.

The electronic board 15, the block diagram of which is shown in FIG. 6, also comprises a second antenna 531—referred to below as "mobile antenna" which is connected to a power supplier 532 which supplies electric energy to the optical beam emitter device 16 and to the optical beam receiver device 18. The mobile station comprises, for this purpose, a driver circuit 533 for said emitter 16 and a driver circuit 535 for said receiver 18.

This electronic board preferably also comprises a read circuit 537 for the signal received by said optical beam receiver 18, the output of which is connected to said mobile antenna 531.

The electronic board also comprises a device for enabling the power supply of said board. In particular, this device comprises an accelerometric switch 538 which is sensitive to the movement of the wheel on which said mobile station is mounted. This accelerometric switch is preferably connected downstream of said power supplier 532 so that the electrical connection between said power supplier 532 and the optical beam emitter device 16 is open when the wheel is not moving and closed when the wheel is moving.

Figure 5:
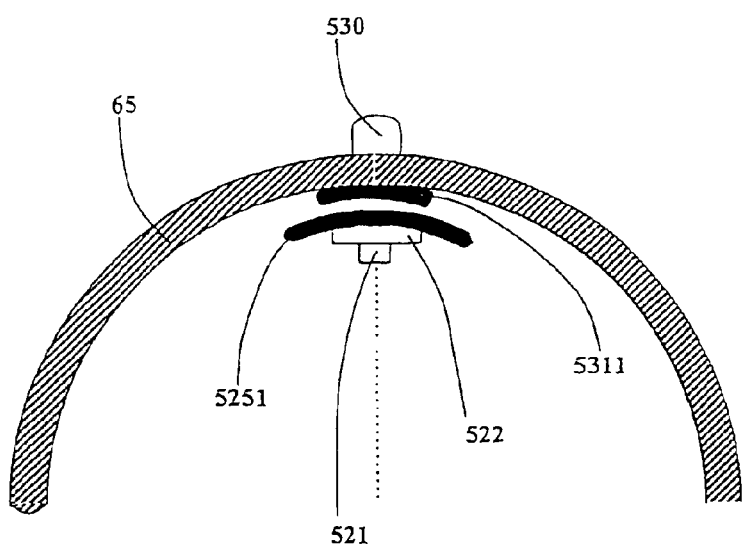
FIG. 5 shows a detail of the wheel according to the present invention, illustrating in particular the coupling zone between an antenna arranged on the fixed station and an antenna arranged in the mobile station.

In the preferred embodiment described now, powering of said mobile station is performed by means of magnetic coupling, i.e., the fixed antenna and mobile antenna preferably both comprise an inductive circuit, and the signal exchanged between the two antennae is a magnetic signal. In particular, with reference to FIG. 5, the fixed antenna comprises a fixed coil 5251 supplied by a radiofrequency alternating current generated by the driver circuit and the mobile antenna comprises a mobile coil 5311 fixed to the rim 65 of the wheel.

With each rotation of the tyre wheel, the mobile coil 5311 is located in a position facing the fixed coil 5251 and intercepts the magnetic field generated by the aforementioned coil. A corresponding electric current is induced in the mobile coil 5311 and is stored by said power supplier 532 and provides the energy necessary for operation of the mobile station as a whole. This power supplier 532, in a known manner, preferably comprises a bridge of diodes or equivalent devices able to convert a sinusoidal current, which is a generated whenever the fixed coil is located in a position facing the mobile coil, into a direct current. The current thus obtained powers the optical beam emitter device and the optical beam receiver device. In particular, this current powers the driver devices 533 and 535.

Said mobile station also comprises an electric energy storage device 539 in which electric energy is stored during periods of travel of the vehicle, in particular during rotation of the tyre. Said device preferably comprises an electronic driver circuit, which picks up the induced voltage generated by said antennae, and a miniaturized rechargeable battery 5391, or alternatively a supercapacitor, in which this induced voltage is stored. A pressure sensor 5392 for monitoring the pressure of the tyres is connected to this battery. The device also comprises a transmitter device 5393 for communication with said control unit 4 provided in the vehicle.

The transmitter device 5393 communicates with said control unit 4 preferably by means of radio waves.

During rotation of the tyre, i.e. in the normal travel condition of the vehicle, when the anti-theft device is deactivated, this emitter/receiver device is used to detect the deformations of the vehicle tyres during their movement.

The Applicant has filed the patent application No. WO0108908 which describes a system for detecting the deformations of a tyre and which explains in detail the measurements which are performed inside the tyre.

Figure 7:
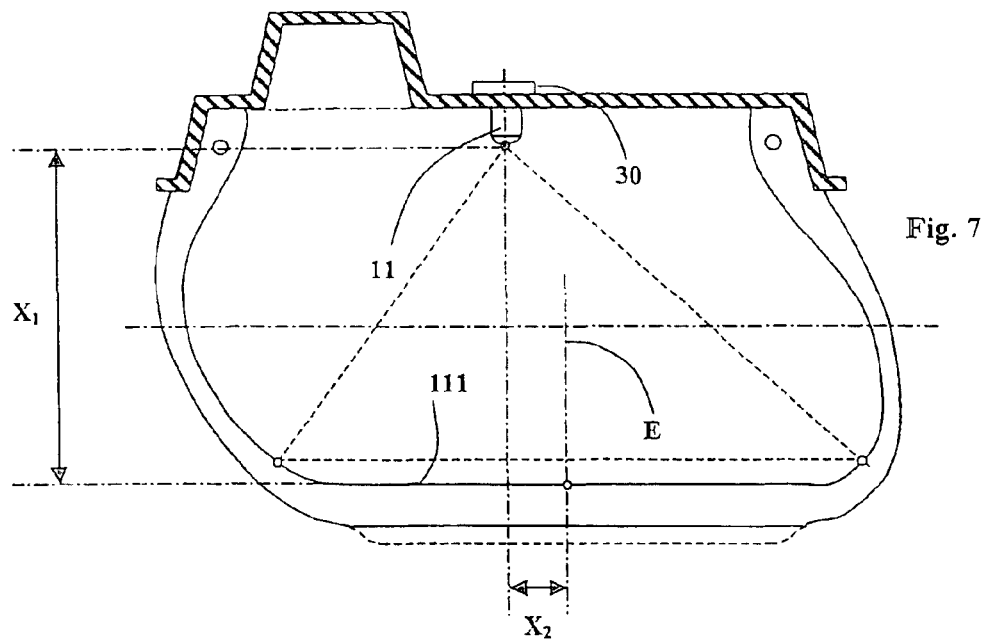
FIG. 7 shows a cross section through a tyre mounted on its support rim during conditions of side slip, with two characteristic distances measured by the sensor according to FIG. 2 being indicated.
Figure 8:
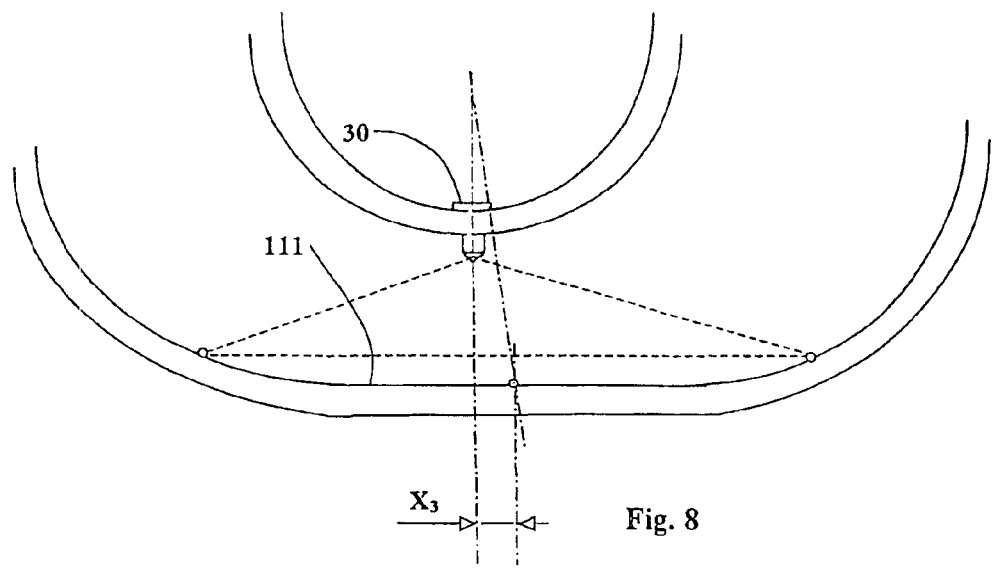
FIG. 8 shows a longitudinal section through a tyre mounted on its support rim in the braking condition, with a characteristic distance measured by the sensor according to FIG. 2 being shown.

FIGS. 7 and 8 illustrate the measurements performed inside the tyre by means of the emitter/receiver device 11.

The deformations of the tyre considered for the purposes of the present invention are defined as follows:

squashing ($X_1$): the deformation directed along a vertical axis or an axis in any case perpendicular to the road surface;

lateral displacement or skidding or sideslip ($X_2$): deformation directed along the axis of rotation of the tyre;

longitudinal slip or torsion ($X_3$): the deformation in the circumferential direction or that of rolling of the tyre.

The internal surface of the tyre, in particular the so-called liner 111, co-operates with the emitter/receiver device 11 in order to determine $X_1$, $X_2$ and $X_3$.

In FIG. 7, the distance $X_1$ corresponds to the distance between the surface of the liner 111 and the emitter/receiver device 11 in the direction of the rolling radius of the tyre.

In FIG. 7, the distance $X_2$ corresponds to the displacement, in the transverse direction, of the projection point of the emitter/receiver device 11 on the surface of the liner 111 with respect to the point of intersection of the liner surface with the equatorial plane E.

In FIG. 8, the distance $X_3$ corresponds to the displacement, in the circumferential direction, of the projection point of the emitter/receiver device 11 on the surface of the liner 111, along the equatorial plane, with respect to the point of the liner surface at the centre of the contact area.

In order to measure these distances, the emitter/receiver device 11 emits a signal which is reflected by the liner with a different intensity depending on its position with respect to the sensor. In combination with or by way of alternative to the measurement of the intensity, the reflection time of the signal may be measured. The reflected signal received from the emitter/receiver device is suitably coded so as to determine the value of $X_1$, $X_2$ or $X_3$.

Advantageously, the reflected signals may be coded in the emitter/receiver device itself. Said emitter/receiver device may emit, for example, several optical beams towards predetermined points on the liner surface.

For the purposes of the present application, the term "enable" is understood as meaning rendering the system capable of performing detection. In particular, "enable" is understood as meaning connecting a power supply device to a user device, i.e., in the case in question, connecting said power supplier of said mobile station 30 or 530 to said driver circuits of said station.

Said enabling of the accelerometric switch is performed with movement of the wheel. In other words, when the anti-theft device is switched off, the driver circuits of the mobile station are active only when the wheel is moving.

For the purposes of the present application, the term "activate" is understood as meaning rendering detection devices operative. In particular "activate" is understood as supplying power to said mobile station 30 or 530, i.e., transferring electric energy from said power supplier to said driver devices so as to perform the predefined detection operation. Preferably, the mobile station is activated to detect tyre deformations by the fixed station. The power supply enabling device checks whether the voltage induced in the mobile coil of said mobile station is caused by an actual movement of the wheel before enabling powering of the optical part, in particular powering of the optical beam emitter device.

In this way, accidental enabling of the power supply for the mobile station, due for example to randomly induced external magnetic fields, is avoided. A further example of accidental enabling may occur during prolonged stoppage of the vehicle for more than a predefined time period; in this situation the antenna of the fixed station and the antenna of the mobile station could be located in a position facing each other. This could cause an undesirable induced voltage in the mobile coil, which voltage could activate the optical beam emitter and therefore perform said measurements within the tyre in static conditions, i.e. in conditions where the vehicle and wheels are not moving. In static conditions the tyre deformations do not constitute significant data for purposes of checking the behaviour of the tyre and therefore vehicle. When the vehicle and tyres are at a standstill, the useful information may consist, for example, in the value of the inflation pressure or the static load acting on each tyre.

In the embodiment described above, as mentioned, the sensor comprises both the signal emitter element and the element for receiving the reflected signal. It is understood that these two functions may be performed by two independent elements which are separate from each other or by a single element which combines the two together, depending on the specific technology used.

The signal emitted by the emitter device 11 may be chosen from a vast range of types of signals which may be used: preferably those signals in the form of sound waves, for example ultrasound waves, or electromagnetic waves, which are reflected by the inner surface of the tyre, are used.

The transfer of the abovementioned measurements detected by the mobile station during the rolling movement of the tyre may be performed by means of said pair of antennae. A signal corresponding to the measurements performed is transferred from the mobile station to the fixed station and then to the vehicle in the same manner in which the electric energy is transferred to the mobile station.

When the anti-theft device is switched on, i.e. when the vehicle is at a standstill, the accelerometric switch disables the driver circuits of the optical beam emitter and optical beam receiver. In this way, only the pressure sensor and the accelerometric switch remain enabled, said devices being powered by said electric energy storage device 239.

The need to provide the sensor as a whole with an independent energy supply is rendered less critical by the choice to limit, to the pressure and acceleration sensors alone, monitoring of the anomalous effects due to an attempted theft. Since accelerometric devices and pressure sensors may be made using piezoelectric technology, the abovementioned electronic driver circuit for these sensors may be designed so as to limit operation of the circuit itself to periodic monitoring of a high-impedance source such as the piezoelectric sensors; activation of the transmission system will occur only in the case where an anomalous condition actually occurs.

Since the energy requirements are therefore limited, the storage device may be realized using components able to withstand long operating periods, this source not being required to have the capacity to power the transmitter device continuously.

The anti-theft device in accordance with the present invention operates in the following manner.

In any condition where:

a) the immobilization device 2 has not recognized the disabling action associated with the user possessing the key (i.e., an identification code), and b) the control unit 4 has previously determined a parked state of the vehicle, the anti-theft device connected to the tyres is active. In this condition the following circumstances may occur:

The vehicle is raised rigidly, causing a reduction in the load acting on all the wheels which are normally in contact with the ground. In this case, the four sensors (51, 52, 53 and 54) are activated and transmit the information to the control unit 4 which is able to communicate the alarm condition to the immobilization device by means of the signal which is supplied to the latter by said second logic gate 22.

An individual wheel is removed. In this case the sensor of the wheel which is removed is activated as soon as the corresponding semi-axle is raised from the ground, resulting in the same sequence of operations described in the preceding paragraph.

The vehicle is raised so that it may be towed away by means of rolling on the non-driving wheels. In this case, activation may be produced both by the variations in pressure associated with the process of raising the forecarriage and by the accelerations resulting from rolling and detected by the accelerometric device. Activation of the sensor also allows the type of event in progress to be further determined since, in the event of this method of theft, it will subsequently be possible to determine variations in the deformations of the tyre by means of the optical device incorporated in the sensor itself.

The tyre is deflated as a result of an attempt to remove the emitter/receiver 11 or due to an act of vandalism; in this case the process of activation of the alarm is similar to that described above in the case of removal of a single wheel.

In the case of removal of the vehicle by means of towing, the emitter/receiver device receives the energy necessary for normal operation by means of said pair of inductive antennae, as soon as the state of movement of the vehicle has been determined by means of operation of the accelerometric device. In these conditions, the optical sensor will also be activated, making it possible to use the information regarding the deformations of the tyres for the purpose of a further check regarding the method of displacement of the vehicle. This check may be performed for example using a specific software inside the control unit 4 described in the preceding figure.

The data supplied by the tyres and received by the control unit may also be used to ensure a high level of protection against false alarms, for example, by distinguishing rapid variations (with a characteristic duration of less than one minute) from normal variations due to the natural deflation of the tyre. It will also be possible to interpret the sign of the variations in pressure which have occurred so as to prevent operation of the device as a result of normal operating situations (for example inflation of the tyre).

Mechanical disassembly of the sensor may also be designed so as to render this operation simple only if the person performing said operation possesses a special tool which can, if necessary, be personalized for each set of anti-theft devices. In this way, the attempted removal of the emitter/receiver device by means of forced unscrewing of the threaded base will result in probable damage such that the immediate outflow of air under pressure and deflation of the tyre itself inevitably occurs, with the consequent impossibility of immediate towing away of the vehicle.

That which has been commented and described hitherto refers to the situation—moreover usual—where the new anti-theft device can be combined with a pre-existing immobilization apparatus.

As a result of radio transmission it is in fact possible to interface the control unit 4 on board the vehicle not only with an immobilization device of the standard type, but advantageously with other types of anti-theft devices such as, for example, solenoid valves for interrupting the fuel supply, automatic gearbox mechanisms which are activated electrically, etc.

The possibility of distinguishing a theft perpetrated by raising of a parked vehicle from that consisting in removal of said vehicle by a breakdown lorry or similar vehicle also means that, in association with a GPS system, it is possible to alert automatically the police division which is best suited for the action required—namely a surprise intervention if the vehicle is at a standstill or pursuit of the criminals if the vehicle has been towed away.

Moreover, this sensor, in a simplified embodiment, may also be devoid of the emitter/receiver 11 and the pair of antennae and be equipped solely with the pressure sensor and the accelerometric device. In this case the electric energy storage device comprises a long-life battery. In this case, in the condition where the anti-theft device is active, the accelerometric switch enables measurement of the pressure sensor only when there is movement of at least one of the wheels. Such a version may advantageously also be applied to two-wheel vehicles in which the immobilization device triggers this operating procedure upon movement of at least one of the wheels.

What is claimed is:

1. An anti-theft device for a vehicle with tyre wheels, comprising:
    an immobilization device;
    at least one detection control unit; and
    at least one sensor;
    wherein the immobilization device activates an anti-theft procedure,
    wherein the at least one detection control unit is connected to the immobilization device,
    wherein the at least one detection control unit verifies an alarm condition,
    wherein the at least one sensor is associated with one or more of the tyre wheels;
    wherein the at least one sensor detects movement of the associated one or more tyre wheels,
    wherein the at least one sensor detects inflation pressure of the associated one or more tyre wheels, and
    wherein the at least one sensor communicates to the at least one detection control unit if the at least one sensor detects variation in inflation pressure of the associated one or more tyre wheels corresponding to raising the associated one or more tyre wheels from contact with the ground.

2. The anti-theft device of claim 1, wherein the at least one sensor comprises:
    a mobile station; and
    a fixed station;
    wherein the mobile station is associated with a rim of a respective tyre wheel,
    wherein the fixed station is associated with the vehicle, and
    wherein the fixed station supplies electrical energy to the mobile station during movement of the respective tyre wheel.

3. The anti-theft device of claim 2, wherein the mobile station comprises an accelerometric switch.

4. The anti-theft device of claim 2, wherein the mobile station comprises a pressure sensor.

5. The anti-theft device of claim 2, wherein the mobile station comprises an accelerometric switch, and
    wherein the mobile station further comprises a pressure sensor.

6. The anti-theft device of claim 2, wherein the mobile station comprises a device that stores at least some of the electrical energy supplied by the fixed station.

7. The anti-theft device of claim 2, wherein the mobile station comprises a transmitter device,
    wherein the transmitter device communicates to the at least one detection control unit information detected by an accelerometric switch, and
    wherein the transmitter device further communicates to the at least one detection control unit information detected by a pressure sensor.

8. The anti-theft device of claim 2, wherein the fixed station supplies electrical energy to the mobile station at least once for each revolution of the respective tyre wheel.

9. The anti-theft device of claim 2, wherein the fixed station comprises:
    a support element; and
    an electronic board;
    wherein the support element is disposed on a hub on which the rim is mounted, and
    wherein the electronic board is disposed on the support element.

10. The anti-theft device of claim 2, wherein the fixed station comprises a fixed antenna, and
    wherein the fixed antenna communicates with a mobile antenna of the mobile station.

11. The anti-theft device of claim 10, wherein the fixed antenna and the mobile antenna are inductively coupled together.

12. The anti-theft device of claim 1, wherein the variation in inflation pressure corresponds to raising the tyre wheels on one end of the vehicle from contact with the ground.

13. The anti-theft device of claim 1, wherein the variation in inflation pressure corresponds to raising the tyre wheels on both ends of the vehicle from contact with the ground.

14. The anti-theft device of claim 1, wherein the immobilization device activates the anti-theft procedure if:
   the immobilization device has not recognized a disabling action associated with an identification code; and
   the at least one detection control unit has determined a parked state of the vehicle.

15. A method for activating an anti-theft device for a vehicle with tyre wheels, comprising:
   detecting an alarm condition from at least one of the tyre wheels;
   receiving the detected condition; and
   activating an anti-theft procedure;
   wherein detecting the alarm condition comprises detecting variation in inflation pressure of the at least one of the tyre wheels corresponding to raising the at least one of the tyre wheels from contact with the ground.

16. The method of claim 15, wherein detecting the alarm condition further comprises detecting rotation of the at least one of the tyre wheels.

17. The method of claim 15, wherein detecting the alarm condition comprises detecting variation in inflation pressure of more than one of the tyre wheels corresponding to raising the more than one of the tyre wheels from contact with the ground.

18. The method of claim 15, wherein the variation in inflation pressure corresponds to raising the tyre wheels on one end of the vehicle from contact with the ground.

19. The method of claim 15, wherein the variation in inflation pressure corresponds to raising the tyre wheels on both ends of the vehicle from contact with the ground.

20. The method of claim 15, wherein the anti-theft procedure is activated if:
   an immobilization device of the vehicle has not recognized a disabling action associated with an identification code; and
   a detection control unit of the vehicle has determined a parked state of the vehicle.

21. An anti-theft device for a vehicle with tyre wheels, comprising:
   an immobilization device;
   a detection control unit; and
   at least one sensor;
   wherein the immobilization device activates an anti-theft procedure,
   wherein the detection control unit is connected to the immobilization device,
   wherein the detection control unit verifies an alarm condition,
   wherein each sensor is associated with one of the tyre wheels,
   wherein each sensor detects movement of the associated tyre wheel,
   wherein each sensor detects inflation pressure of the associated tyre wheel, and
   wherein the at least one sensor communicates to the detection control unit if the at least one sensor detects variation in inflation pressure of the associated tyre wheel corresponding to raising the associated tyre wheel from contact with the ground.

22. The anti-theft device of claim 21, wherein the at least one sensor comprises:
   a mobile station; and
   a fixed station;
   wherein the mobile station is associated with a rim of a respective tyre wheel,
   wherein the fixed station is associated with the vehicle, and
   wherein the fixed station supplies electrical energy to the mobile station during movement of the respective tyre wheel.

23. The anti-theft device of claim 22, wherein the mobile station comprises an accelerometric switch.

24. The anti-theft device of claim 22, wherein the mobile station comprises a pressure sensor.

25. The anti-theft device of claim 22, wherein the mobile station comprises an accelerometric switch, and
   wherein the mobile station further comprises a pressure sensor.

26. The anti-theft device of claim 21, wherein the variation in inflation pressure corresponds to raising the tyre wheels on one end of the vehicle from contact with the ground.

27. The anti-theft device of claim 21 wherein the variation in inflation pressure corresponds to raising the tyre wheels on both ends of the vehicle from contact with the ground.

28. The anti-theft device of claim 21, wherein the immobilization device activates the anti-theft procedure if:
   the immobilization device has not recognized a disabling action associated with an identification code; and
   the detection control unit has determined a parked state of the vehicle.

29. An anti-theft device for a vehicle with tyre wheels, comprising:
   an immobilization device;
   at least one detection control unit; and
   at least one sensor;
   wherein the immobilization device activates an anti-theft procedure,
   wherein the at least one detection control unit is connected to the immobilization device,
   wherein the at least one detection control unit verifies an alarm condition,
   wherein each sensor is associated with one of the tyre wheels,
   wherein each sensor detects movement of the associated tyre wheel,
   wherein each sensor detects inflation pressure of the associated tyre wheel, and
   wherein the at least one sensor communicates to the at least one detection control unit if the at least one sensor detects variation in inflation pressure of the associated tyre wheel corresponding to raising the associated tyre wheel from contact with the ground.

30. The anti-theft device of claim 29, wherein the at least one sensor comprises:
   a mobile station; and
   a fixed station;
   wherein the mobile station is associated with a rim of a respective tyre wheel,
   wherein the fixed station is associated with the vehicle, and
   wherein the fixed station supplies electrical energy to the mobile station during movement of the respective tyre wheel.

31. The anti-theft device of claim 30, wherein the mobile station comprises an accelerometric switch.

32. The anti-theft device of claim 30, wherein the mobile station comprises a pressure sensor.

33. The anti-theft device of claim 30, wherein the mobile station comprises an accelerometric switch, and wherein the mobile station further comprises a pressure sensor.

34. The anti-theft device of claim 29, wherein the variation in inflation pressure corresponds to raising the tyre wheels on one end of the vehicle from contact with the ground.

35. The anti-theft device of claim 29, wherein the variation in inflation pressure corresponds to raising the tyre wheels on both ends of the vehicle from contact with the ground.

36. The anti-theft device of claim 29, wherein the immobilization device activates the anti-theft procedure if:

the immobilization device has not recognized a disabling action associated with an identification code; and the at least one detection control unit has determined a parked state of the vehicle.

37. An anti-theft device for a vehicle with tyre wheels, comprising:

an immobilization device;

a detection control unit; and a sensor;

wherein the immobilization device activates an anti-theft procedure, wherein the detection control unit is connected to the immobilization device, wherein the detection control unit verifies an alarm condition, wherein the sensor is associated with a respective tyre wheel, wherein the sensor detects movement of the respective tyre wheel, wherein the sensor detects inflation pressure of the respective tyre wheel, and wherein the sensor communicates to the detection control unit if the sensor detects variation in inflation pressure of the respective tyre wheel corresponding to raising the respective tyre wheel from contact with the ground.

38. The anti-theft device of claim 37, wherein the sensor comprises:

a mobile station; and a fixed station;

wherein the mobile station is associated with a rim of the respective tyre wheel, wherein the fixed station is associated with the vehicle, and wherein the fixed station supplies electrical energy to the mobile station during movement of the respective tyre wheel.

39. The anti-theft device of claim 38, wherein the mobile station comprises an accelerometric switch.

40. The anti-theft device of claim 38, wherein the mobile station comprises a pressure sensor.

41. The anti-theft device of claim 38, wherein the mobile station comprises an accelerometric switch, and wherein the mobile station further comprises a pressure sensor.

42. The anti-theft device of claim 37, wherein the variation in inflation pressure corresponds to raising the tyre wheels on one end of the vehicle from contact with the ground.

43. The anti-theft device of claim 37, wherein the variation in inflation pressure corresponds to raising the tyre wheels on both ends of the vehicle from contact with the ground.

44. The anti-theft device of claim 37, wherein the immobilization device activates the anti-theft procedure if:

the immobilization device has not recognized a disabling action associated with an identification code; and the detection control unit has determined a parked state of the vehicle.

* * * * *